Sept. 12, 1961 J. J. WATSON 2,999,515
PIPE LINE LEAK CLAMP
Filed Dec. 20, 1957
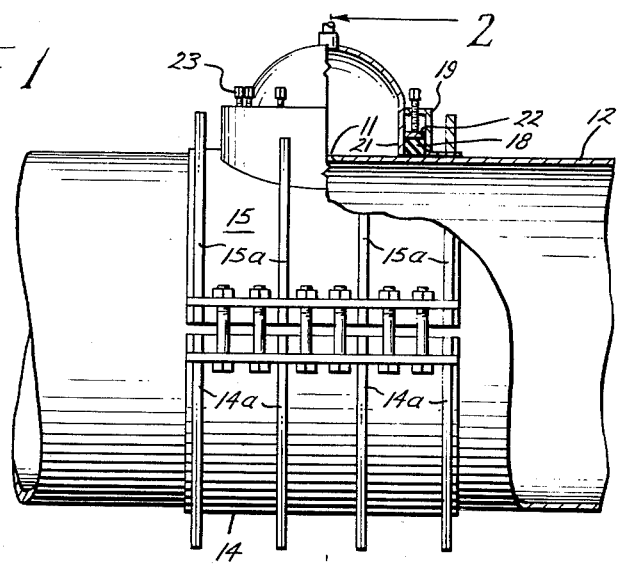
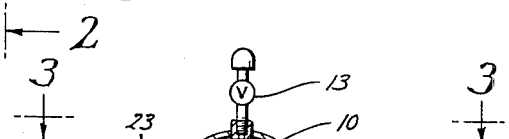
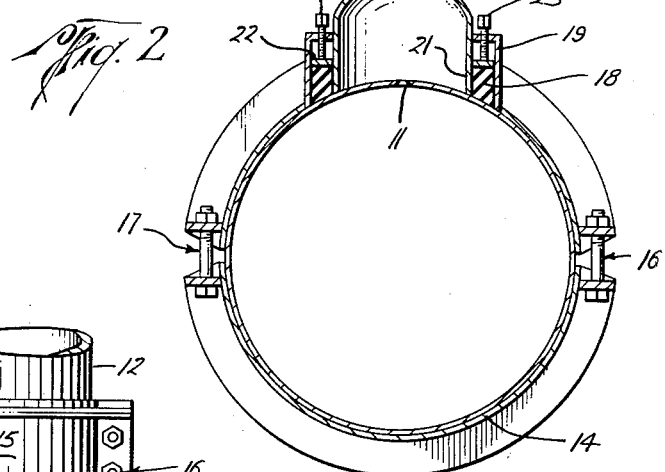
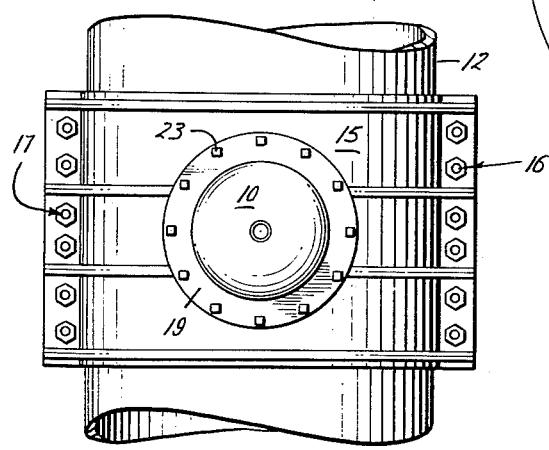
John J. Watson
INVENTOR.
BY J. Vincent Martin
Joe E. Edwards
M. Harvey Gay
ATTORNEYS

United States Patent Office 2,999,515
Patented Sept. 12, 1961

2,999,515
PIPE LINE LEAK CLAMP
John J. Watson, P.O. Box 1149, Jacksonville, Tex.
Filed Dec. 20, 1957, Ser. No. 704,062
2 Claims. (Cl. 138—99)

This invention relates to a pipe repair device for sealing leaks in pipe containing fluids under pressure.

There are many pipelines which must be repaired while in service. This presents the problem of effecting a seal over a break while high-pressure fluid escaping through the break is opposing the attempt to perfect a seal. The problems encountered are many-fold and include the tendency of the escaping fluid to cut away the sealing member as it is being applied to the pipe and the tendency of the force applied to the pipe in perfecting the seal to further rupture the pipe, particularly where the leak occurs in a corroded area of a pipe in which the pipe wall has been weakened, together with many other kindred problems.

It is frequently necessary to repair a pipe in relatively inaccessible areas where the pipe repair device must be carried considerable distances by hand.

By this invention there is provided a light pipe repair device which employs a seal member having a minimum area of engagement with the pipe so that the seal may be perfected without excessive force which would tend to collapse the pipe. The seal is preferably perfected along an annulus spaced some distance from the leak area which is usually at a weakened section of the pipe. The invention may further provide a device for clamping the seal means on the pipe which will strengthen the pipe at the leak.

It is an object of this invention to provide a pipe repair device which seals about a leak with a minimum area of contact between the seal member and pipe and yet seals at a distance from the leak so as not to apply a collapsing force to the pipe at the leak.

Another object is to provide a pipe repair device in which the seal between the device and pipe is provided at an annulus surrounding the leak so as not to apply sealing pressure directly to the leak and in which the sealing member is urged into engagement with the pipe after the device has been clamped onto the pipe.

Another object is to provide a pipe repair device which is light and economical in construction and yet provides a snug-fitting sleeve to clamp about a pipe and reinforce the weakened section in combination with a seal for stopping a leak which is so constructed that sealing pressure is not applied directly to the leaking section of the pipe which may be sufficiently weakened that it will tend to collapse under sealing pressure.

Other objects, features and advantages of the invention will be apparent from the specification, the drawing and claims.

In the drawing wherein there is shown an illustrative embodiment of this invention and wherein like reference numerals indicate like parts:

FIGURE 1 is a view in side elevation of a device constructed in accordance with this invention in position on a pipe with a portion of the pipe and device cut away to show a section of the leak-sealing assembly in cross-section;

FIGURE 2 is a view along the lines 2—2 of FIGURE 1; and

FIGURE 3 is a view along the lines 3—3 of FIGURE 2.

Referring now to the drawing, the leak chamber provided for overlying the leaky area of the pipe may take any desired form. The chamber is preferably dome-shaped as in the case of chamber 10 in the form of invention illustrated in the drawings. The leak chamber should be open at one end and the open end of the chamber is adapted to overlie the leaky area 11 of the pipe 12.

During installation of the leak chamber over the pipe, it is preferred to provide for venting of the chamber so that fluid escaping from the pipeline 12 through hole 11 will not tend to cut the seal as it is being forced against the pipe. Such a vent may be provided in any desired manner as by valve 13.

The leak chamber may be secured to the pipe in any desired manner. However, it is preferred to utilize a means which will strengthen the pipe as the pipe in the area of the leak is frequently weakened. Thus in the preferred form of the invention, a split sleeve provided by a plurality of sections such as sections 14 and 15 are preferred as a means for clamping the leak chamber to the pipe. The split sleeve is provided with a plurality of reinforcing ribs 14a and 15a carried by the sections 14 and 15, respectively. With this arrangement it will be apparent that when the split sleeve is tightly clamped about the pipe by the bolts and nuts shown at 16 and 17, the sleeve will considerably reinforce the section of pipe which it surrounds.

A seal is provided between the wall of the leak chamber and pipe by a ringlike seal. To avoid cutting of this seal, it is urged into sealing engagement with the chamber 10 and pipe only after the device has been clamped about the pipe.

Preferably, the seal means is provided by a ringlike or annular seal member 18 which is positioned within a groove 19 carried by the open end of the leak chamber 10. If desired, the outer periphery of the leak chamber at 21 may provide a portion of the seal groove. However, it will be understood that this groove might be provided by a completely separate member sealingly secured to the leak chamber.

In order to contain the seal member 18 within the groove 19, the open end of the groove is contoured approximately on a cylindrical curve whose radius is the same as the inner surface of the sleeve, which will of course be the radius of the outer surface of the pipe. This will provide for abutment of the inner and outer walls of the annular groove 19 with the pipe.

The seal 18 may be energized by any desired means accessible from the exterior of the device which will compress the seal 18 into sealing engagement with the wall of the leak chamber 10 and the wall of the pipe. Preferably, the means for energizing the seal includes a compression ring 22 in the bottom of groove 19 and a plurality of jack screws 23 which are threadedly mounted in the bottom of the groove 19. When jack screws 23 are extended into the groove, they move the compression ring 22 toward the pipe and compress the seal member 18 into sealing engagement with the leak chamber 10 and with the exterior surface of the pipe.

In operation, the vent valve 13 is open, the split sleeve 14 and 15 loosely secured about the pipe in a position in which the device does not overlie the leak. This will avoid interference by the leaking fluid with positioning the device about the pipe. Of course it can be applied directly over the leak, but it is preferred to assemble the device on the pipe as much as possible before moving it into position over the leak. With all of the bolts 16 and 17 in position, the split sleeve is moved over the leak with the leak chamber centered as closely as possible over the leaky section 11 of the pipe. The bolts 16 and 17 are then drawn up tight to force the split sleeve into snug engagement with the pipe and the edges of seal groove 19 into firm engagement with the pipe.

The jack screws 23 are then run in to the bottom of the groove to compress seal 18 into sealing engagement with the leak chamber and pipe to seal between the chamber and the pipe. During this time leaking fluid from break 11 is escaping through the vent valve 13. After the seal is completed, the vent valve 13 is closed to complete the repair of the pipe.

From the above, it will be seen that a device has been provided which will seal a leak in a pipe without applying direct pressure to the leaky section which may be weakened. As the seal is applied at the perimeter of a fair-sized circle, a standard size leak clamp constructed in accordance with this invention may be provided to seal about leaks of various sizes.

There has also been provided in combination with the type of seal which does not tend to collapse a pipe, a split sleeve means for securing the device to a pipe which reinforces a pipe at its weakest section. As this split sleeve is not itself subjected to pressure, it may be constructed much lighter than the type of split sleeve which is exposed to line pressure. This saves cost and reduces the weight of the sleeve to provide for easier installation.

Theforegoing disclosure and description of the invention is illustrative and explanatory thereof and various changes in the size, shape and materials, as well as in the details of the illustrated construction, may be made within the scope of the appended claims without departing from the spirit of the invention.

I claim:

1. A pipe repair device comprising, a longitudinally split sleeve adapted to snugly embrace a pipe and reinforce the wall of the pipe, means for securing the sections of the sleeve together with each section in firm abutment with a pipe therebetween, a leak-chamber open at one end carried by the sleeve, said chamber being closed except at said one end to confine fluids when said one end of the chamber is sealed to a pipe over a leak, a continuous wall carried by the chamber and spacedly surrounding the wall thereof at its open end to provide a seal-receiving channel with the open end of the wall terminating approximately in the cylindrical surface constituted by the inner surface of the sleeve, seal means in said channel, and compression means accessible from the exterior of the device for urging the seal means into firm engagement with the pipe and the sidewalls of the channel adjacent the pipe to provide a seal between the pipe and said open end of said chamber.

2. A pipe repair device as set forth in claim 1 in which said leak-chamber consists of a cylindrical wall portion surmounted by an integral dome-shaped wall portion and said continuous wall carried by the leak-chamber and spacedly surrounding the cylindrical wall portion thereof at its open end to provide said seal-receiving channel is integrally connected to said split sleeve and terminates approximately in the cylindrical surface constituted by the inner surface of the sleeve and is further integrally connected to said cylindrical wall portion in the region where said dome-shaped wall portion merges with said cylindrical wall portion by a wall member which forms the closed end of said seal-receiving channel.

References Cited in the file of this patent

UNITED STATES PATENTS

| | | |
|---|---|---|
| 1,911,126 | Pfefferle | May 23, 1933 |
| 2,199,552 | Watson | May 7, 1940 |
| 2,655,946 | Morris | Oct. 20, 1953 |
| 2,708,951 | Risley | May 24, 1955 |